United States Patent [19]
Morita et al.

[11] Patent Number: 5,991,258
[45] Date of Patent: *Nov. 23, 1999

[54] OPTICAL DISK HAVING DATA STORED ON A LAND PORTION AND A GROOVE PORTION WITH THE LAND PORTION HAVING A GREATER WIDTH THAN THE GROOVE PORTION

[75] Inventors: Seiji Morita, Yokohama; Hiroyuki Matsumoto, Tokyo, both of Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/811,600

[22] Filed: Feb. 28, 1997

[30] Foreign Application Priority Data

Feb. 29, 1996 [JP] Japan ................................... 8-042996

[51] Int. Cl.$^6$ ...................................................... G11B 7/00
[52] U.S. Cl. .......................................................... 369/275.4
[58] Field of Search ............................. 369/275.1, 275.2, 369/275.3, 275.4, 13

[56] References Cited

U.S. PATENT DOCUMENTS

| | | | |
|---|---|---|---|
| 5,115,424 | 5/1992 | Nakajima et al. | 369/275.1 |
| 5,386,411 | 1/1995 | Yanagisawa et al. | 369/275.4 |
| 5,430,706 | 7/1995 | Utsunomiya et al. | 369/275.4 |
| 5,517,486 | 5/1996 | Haneda | 369/275.4 |
| 5,581,539 | 12/1996 | Horie et al. | 369/275.1 |
| 5,586,109 | 12/1996 | Inui et al. | 369/275.1 |
| 5,602,824 | 2/1997 | Ooki et al. | 369/275.4 |
| 5,635,267 | 6/1997 | Yamada et al. | 369/283 |
| 5,673,250 | 9/1997 | Mieda et al. | 369/32 |
| 5,745,475 | 4/1998 | Ohno et al. | 369/275.4 |
| 5,852,591 | 12/1996 | Fukumoto | 369/275.4 |
| 6,406,546 | 4/1995 | Uchiyama et al. | 369/275.4 |

FOREIGN PATENT DOCUMENTS 596 716 11/1994 European Pat. Off. .
6-223421 8/1994 Japan .

Primary Examiner—Nabil Hindi

[57] ABSTRACT

An optical disk and its recording and playback method. The optical disk has a groove portion and a land portion, in which the land portion is at a distance of greater than or equal to 100 nm from the groove portion and the land portion has a land width greater than a groove width of the groove portion. The method includes recording the data on a groove portion and a land portion of the optical disk; and playing back the recorded data with a land reflectivity equal to groove reflectivity when the land portion is at a distance of greater than or equal to 100 nm from the groove portion and a land width of the land portion is greater than a groove width of the groove portion.

8 Claims, 2 Drawing Sheets

DIRECTION
OF
LASER
BEAM

5,991,258

OPTICAL DISK HAVING DATA STORED ON A LAND PORTION AND A GROOVE PORTION WITH THE LAND PORTION HAVING A GREATER WIDTH THAN THE GROOVE PORTION

CROSS-REFERENCE TO RELATED APPLICATIONS

This application is based upon and claims priority of Japanese Patent Application No. 08-042996 filed Feb. 29, 1996, the contents being incorporated herein by reference.

BACKGROUND OF THE INVENTION

1. Field of the Invention

The present invention relates to optical disks. More specifically, the present invention relates to an optical disk and its recording and playback method that reduces thermal crosstalk and improves playback signal levels even when the distance between the levels of the land portions and the groove portions of the disk is large.

2. Description of the Related Art

Optical disks, storing data at high density and capable of rapid data processing, are gaining more attention as storage mediums for computers. Optical disks, including for instance 5.25 inch, 3.5 inch, or the like diameter, of the magneto-optical type or phase change type, in read-only or rewritable formats, have been standardized by ISO standards and are expected to increase in use. Moreover, standards have been recently determined for digital video disks ("DVD"). The use of these and other types of optical disks (and their applications) are expected to increase in the multimedia field.

In optical disks, a guide for tracking (i.e., a guide groove) is formed with a concave or convex shape, in a spiral form. An outgoing laser beam generated by an optical pickup portion of a recording and playback device uses the guide groove to pass along a data sequence. According to ISO standards, a concave portion of the guide groove, as seen from the pickup device, is termed a "land". The convex portion of the guide groove, as seen from the pickup device, is termed a "groove" and is closer to the pickup device than the land portion. Data is written on the land and/or the groove portions of the guide grooves. The distance from a center of a land (or a groove) to a center of an adjacent land (or groove) is termed the "track pitch". A series of convex marks, formed in advance as a series of pits, serve as a preformatted signal indicating a track number or sector number.

A groove width W is defined as $W=(W_{top}+W_{bottom})/2$, where $W_{top}$ is the width of the groove top and $W_{bottom}$ is the width of the groove bottom. The height from the groove bottom up to the groove top, namely, the difference (or distance) between the levels of the land portions and the groove portions, is termed the "groove depth". For the dimensions of a groove depth, take for example a groove width of 0.3–0.6 $\mu$m using a land recording method. With $\lambda$ as the wavelength of the laser light used for recording and playback, and "n" as the refractive index of the substrate, the groove depth is between $\lambda/(10\cdot n)$ and $\lambda/(6\cdot n)$.

A track pitch of 1.6 $\mu$m was a standard, but recently, in order to record data at a higher density, a narrowed track pitch of 1.4 $\mu$m, 1.2 $\mu$m, and 1.0 $\mu$m has been used for recording. However, with an optical pickup having an objective lens with a numerical aperture (NA) of 0.5–0.6, problems arise when the track pitch is narrowed to less than 1.4 $\mu$m. For instance, the effect due to data written on adjacent tracks being erroneously read out (i.e., "optical crosstalk") becomes extremely large. Moreover, because the tracking error signal necessary for tracking becomes extremely small, reliable tracking becomes difficult.

As a different approach to recording data at a high density, a land-groove recording method had been proposed. In contrast to the above method which recorded on only one of the lands or grooves, the land-groove method records data on both the lands and the grooves. Recording density is increased by halving the track pitch. For example, in the case that the distance from the center of a land (or groove) to the center of an adjacent land (or groove) is 1.4 $\mu$m, by recording on both lands and grooves, the track pitch becomes 0.7 $\mu$m, and the recording density can be increased. In this land-groove recording method, if a suitable value for the groove depth is taken, the problem of optical crosstalk, in which data of the adjacent groove (land) track is simultaneously read out while reading out a land (groove) track, can be prevented. Moreover, because the distance between land (or groove) centers is 1.4 $\mu$m, the tracking error signal can be kept sufficiently large.

Despite solving the optical crosstalk problem and maintaining a suitable tracking error signal, there is still a problem in which the temperature of an adjacent track increases due to the heat of a laser beam when data is recorded and erased on a track. With the increased temperature on the adjacent track, data on the adjacent track becomes erased (i.e., "cross erasure" or "thermal crosstalk"). In either the magneto-optical type or the phase change type of optical storage mediums, because both types of optical disks are recorded by means of heat, if the distance between adjacent tracks becomes small, the transfer of heat to the adjacent tracks becomes large and thermal crosstalk occurs.

To what degree the track pitch can be narrowed is decided by this crosstalk. In the prior art optical disks, the difference in level between the land portions and the groove portions (i.e., groove depth) is about 70–80 nm. In an optical disk having this kind of guide groove form, about 0.8 $\mu$m in the magneto-optical type or the phase change type, the light intensity modulated overwrite magneto-optical type is limited to about 0.9–1.0 $\mu$m, and a track narrowing greater than this was found to be difficult.

Consequently, the present inventors, primarily in order to reduce thermal crosstalk, developed an optical disk with a large groove depth. That is, the thermal propagation distance to adjacent tracks is made long by making the difference in the level between land portions and groove portions large. Thus, the effect of heat from adjacent tracks is reduced. For example, in optical disks in which recording is performed in the land portions only, or the groove portions only, the groove depth is 40–90 nm. However, the present invention is directed to deeper groove depths (e.g., 100 nm or greater), whereupon, the track pitch can be narrowed to 0.7 $\mu$m or less.

Nevertheless, if the groove depth is to be 100 nm or more, there is no guidance in the prior art to determine suitable groove depths. First, it is desirable for the land reflectivity and the groove reflectivity to be 0.5 or more in order to maintain a desirable playback signal level. But, the land reflectivity and the groove reflectivity change due to changes in the distance between the level of the land portions and the groove portions. A fall in the playback signal level may result from certain groove depths, causing data readout errors and the like. Moreover, it is desirable for a push-pull signal modulation to be 0.2 or more in order to maintain tracking accuracy. But, tracking may be dislocated if the push-pull signal modulation becomes low due to certain groove depths. Consequently, high speed access becomes impossible and erroneous data erasure and the like may result.

With regard to the playback signal level, if the wavelength of the light spot is $\lambda$, and the refractivity of the optical disk substrate is n, the playback signal level becomes greatest at a groove depth of approximately $m\lambda/(2n)$. Here m is a natural number (m=1, 2, 3, 4, 5, 6 . . . ). For example, when $\lambda$=680 nm, n=1.5 and m=1, the playback signal is greatest at a groove depth of 226.7 nm; when m=2, the playback signal is greatest at a groove depth of 453.3 nm; and when m=3, it is 680 nm. In practice, due to the effect of the direction of polarization and the like, the land/groove level difference at which the playback signal level is the greatest is not exactly $m\lambda/(2n)$. For instance, in the case of linearly polarized light having a plane of polarization in a direction parallel to the guide groove, the groove depth at which the playback signal level is the greatest may be $m\lambda/(1.8\ n)$ or $m\lambda/(1.95\ n)$ and the like. Moreover, the groove depth at which the push-pull signal modulation becomes greatest is at approximately $(2m+1)\lambda/(8\ n)$.

When the best and most suitable groove depths are found from the above viewpoints, groove depth ranges of 110–220 nm, or 230–330 nm, or 350–580 nm are considered to be desirable. Moreover, comparing the cases of playback by means of H polarized light and playback by means of E polarized light, the value of the groove reflectivity Ig/Io by means of H polarized light is considered to be large overall, and a good playback signal level is easily obtained. In the case of playback by means of H polarized light, if the groove depth ranges are 110–210 nm, or 230–320 nm, or 350–440 nm, or 450–570 nm, particularly good results are obtained. Moreover, at a groove depth of 350 nm or more, the thermal crosstalk reduction is effective for a track pitch narrowed down to about 0.3 $\mu$m.

Nevertheless, the following problems arise when the groove depth is large. Namely, in the prior art optical disks in which the land width and the groove width were equal and when the difference in level of the land portions and the groove portions was made large, there was a tendency for the reflectivity in the land portions to become small in comparison with the reflectivity in the groove portions. This discrepancy between land and groove reflectivity is something that arises due to the properties of light as waves. Because the land surfaces seen from the pickup are remote (namely, concave portions), the land surfaces can be considered as a kind of slit having a width equal to a width of the lands. Because it is difficult for light waves to enter the interior of a slit, the reflected light at a land surface is small in comparison with the reflected light at a groove surface. This phenomenon is particularly noticeable in the case where the plane of polarization of the light is parallel with respect to the groove (termed "E polarized light"). In this manner, the land reflectivity is small in comparison to the groove reflectivity, and the playback signal level (carrier level) becomes small when playing back data recorded in the land portions, causing readout errors and the like.

SUMMARY OF THE INVENTION

Accordingly, it is an object of the present invention to solve the above-identified problems and improve playback signal levels from land portions of an optical storage medium when the groove depth is large.

It is a further object of the present invention to prevent the playback signal levels from land portions of an optical storage medium from becoming correspondingly small when the groove depth is made large.

It is another object of the present invention to maintain land reflectivity and groove reflectivity to be approximately the same when the groove depth is made large in an optical storage medium.

It is yet another object of the present invention to prevent readout errors when the groove depth is large in an optical storage medium.

Objects of the present invention are achieved by providing an optical disk having a groove portion and a land portion, in which the land portion is at a distance of greater than or equal to 100 nm from the groove portion and the land portion has a land width greater than a groove width of the groove portion.

Objects of the present invention are also achieved by providing an optical disk having a groove portion and a land portion, in which the land portion is at a distance of greater than or equal to 100 nm from the groove portion, the land portion has a land width greater than a groove width of the groove portion with a land width to groove width ratio of greater than or equal to 1.03, and a distance from a center of said land portion to a center of said groove portion is less than or equal to 0.7 $\mu$m. The land portion may be at the distance from the groove portion in the range of at least one of 110–220 nm, 230–330 nm, and 350–580 nm.

Objects of the present invention are also achieved by providing an optical disk having a groove portion and a land portion, in which the land portion is at a distance of greater than or equal to 100 nm from the groove portion and the land portion has a land width greater than a groove width of the groove portion to maintain an equal land reflectivity and groove reflectivity when incident light is directed onto the optical disk for recording and playback of data.

Objects of the present invention are further achieved by providing a method to record and playback data on an optical disk. The method includes recording the data on a groove portion and a land portion of the optical disk; and playing back the recorded data with a land reflectivity equal to groove reflectivity when the land portion is at a distance of greater than or equal to 100 nm from the groove portion and a land width of the land portion is greater than a groove width of the groove portion.

Moreover, objects of the present invention are achieved by an optical disk, including: a groove portion having a groove width; and a land portion having a land width greater than the groove width, wherein the land portion is at a distance of greater than or equal to $\lambda/(4\cdot n)$nm from the groove.

Still further objects of the invention are achieved by an optical disk, including: a groove portion having a groove width; and a land portion having a land width greater than the groove width with a land width to groove width ratio of greater than or equal to 1.03, wherein the land portion is at a distance of greater than or equal to $\lambda/(4\cdot n)$ nm from the groove portion and a distance form a center of the land portion to a center of the groove portion adjacent to the land portion is less than or equal to 0.7 $\mu$m.

Further objects of the invention are achieved by an optical disk on which an incident light is directed, including a groove portion having a groove width; and a land portion having a land width, wherein the land portion is at a distance of greater than or equal to $\lambda/(4\cdot n)$nm from the groove portion and the land width is greater than the groove width to maintain an equal land reflectivity and groove reflectivity when the incident light is directed onto the optical disk.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings. In order to solve the aforementioned problems, a preferred embodiment of the present invention includes an optical disk having a groove depth of 100 nm or more, and a land width that is wider than a groove width.

In accordance with the preferred embodiments of the present invention, multiple magneto-optical disks are prepared in which the sum of the land width and the groove width is 1.4 $\mu$m and 1.2 $\mu$m. Values of land width to groove width ratio range from 1 to 1.42 in steps of 0.01, and six different values of the groove depth are used, i.e., 100, 150, 180, 210, 245 and 280 nm. A silicon nitride layer, a TbFeCo magneto-optical recording layer, and a silicon nitride layer are formed in succession by sputtering onto these magneto-optical disks. Moreover, the refractive index of the substrate is 1.5.

Setting these magneto-optical disks in succession into a magneto-optical recording and playback device, standardized at a reflectivity "Io" in a region having no guide grooves, the land reflectivity "Il/Io" and the groove reflectivity "Ig/Io" are measured. The light source wavelength $\lambda$ is 680 nm, the numerical aperture NA of the objective lens is 0.55, and the wave front aberration is 0.04 $\lambda$ (rms value). Moreover, the direction of polarization of the incident light is in a parallel direction with respect to the guide groove (E polarized light).

Figure 1:
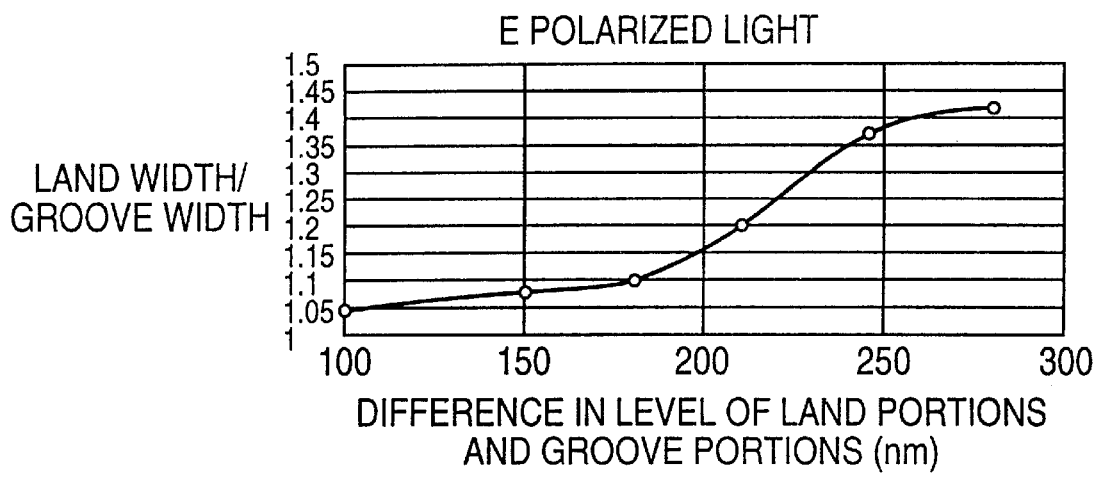
FIG. 1 is a graph showing the relationship of the values of land width to groove width ratios at which the land reflectivity and the groove reflectivity in E polarized light are equal for various values of the groove depth.

FIG. 1 is a graph of the above measurement, showing the relationship of the values of land width to groove width ratios (land width/groove width values) at which the land reflectivity and the groove reflectivity in E polarized light become equal for various values of the difference in level of the land portions and the groove portions. It can be seen from FIG. 1 that according to the groove depth, by making the land width wide in comparison with the groove width, it is possible to do away with the difference between the land reflectivity and the groove reflectivity. For instance, if the value of the land width/groove width ratio is 1.05 or more, the land reflectivity and the groove reflectivity can be approximately the same at a groove depth of about 100 nm. Equal land and groove reflectivity is similarly achieved if the land width/groove width value is about 1.08 and the groove depth is about 150 nm; if the land width/groove width value is about 1.16 and the groove depth is about 200 nm; if the land width/groove width value is about 1.3 and the groove depth is about 230 nm; and if the land width/groove width value is about 1.4 and the groove depth is about 270 nm.

Figure 2:
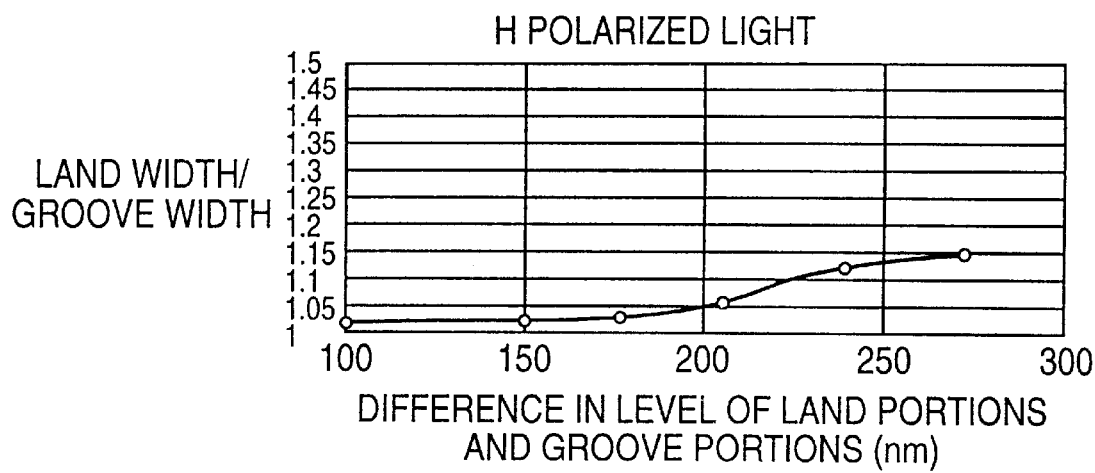
FIG. 2 is a graph showing the relationship of the values of land width to groove width ratios at which the land reflectivity and the groove reflectivity in H polarized light are equal for various values of the groove depth.

Next, a setup similar to the above is disclosed according to a preferred embodiment of the present invention. However, in this case, the direction of polarization of the incident light is now in a direction at right angles to the guide groove (H polarization). FIG. 2 is a graph showing the relationship of the values of land width to groove width ratios (land width/groove width values) at which the land reflectivity and the groove reflectivity in H polarized light became equal for various values of the groove depth. It can be seen from FIG. 2 that for H polarization, in results similar to those in E polarization, making the land width wide in comparison with the groove width removes the difference between the land reflectivity and the groove reflectivity at the various groove depths. For instance, with H polarization incident light, equal land and groove reflectivity is achieved if the value of the land/groove width ratio is 1.03 or more at a groove depth of about 100–170 nm. Equal land and groove reflectivity is similarly achieved if the land width/groove width value is about 1.1 and the groove depth is about 230 nm; and if the land width/groove width value is about 1.15 and the groove depth is about 280 nm.

The above results are substantially unaltered whether the sum of the land width and groove width is 1.4 $\mu$m or 1.2 $\mu$m. The distance between a land center and a groove center adjacent to the land center is 0.7 $\mu$m or less.

According to the above preferred embodiments of the present invention, even when the difference in level of the land portions and the groove portions is large, because the land reflectivity and the groove reflectivity can be made approximately the same, the playback signal level (carrier level) does not become correspondingly small when playing back data which was recorded on the land portions. Thus, an optical disk can be provided in which there are no readout errors of data.

When the land width is greater than the groove width, manufacture of the substrate of the optical disk by injection molding is simplified. Moreover, a higher recording density may be accomplished by shortening the track pitch, especially if the track pitch is less than or equal to 0.6 $\mu$m.

Furthermore, the present invention is more effective when a short wave length light source, for example a blue semiconductor laser beam ($\lambda$:approximate to 420 nm, and the track pitch have to be in the range less than 0.5 $\mu$m) is used. In such occasions, the heat influence from an adjacent track becomes larger because the light spot can be more concentrated.

Figure 3:
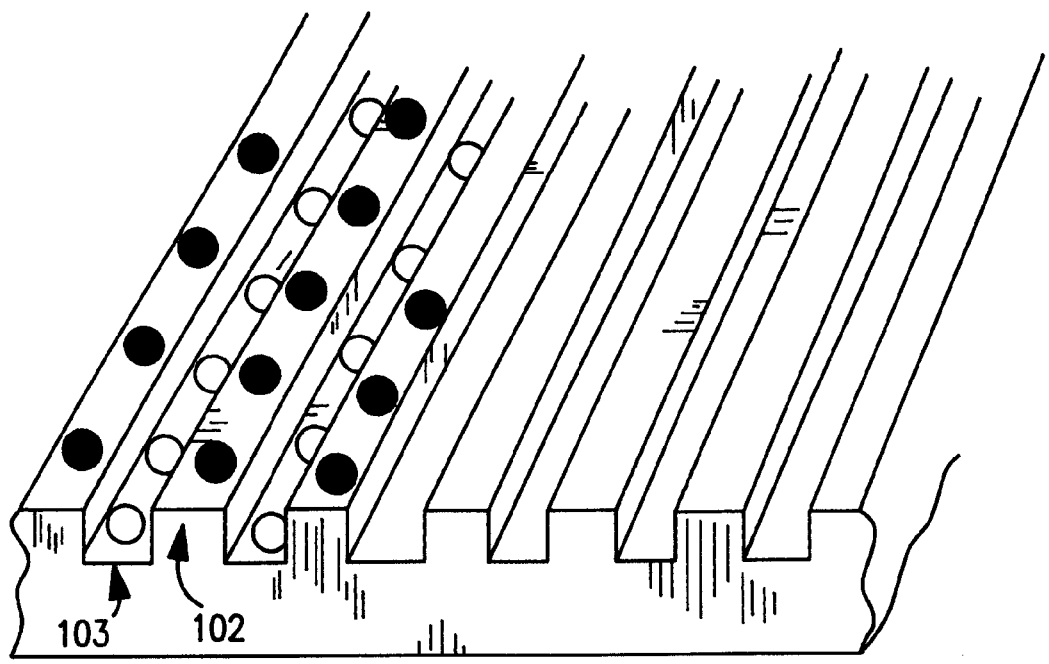
FIG. 3 is an elevated perspective view of an optical disk having data stored on land portions and groove portions according to a preferred embodiment of the present invention.

FIG. 3 is an elevated perspective view of an optical disk 100 having data stored on land portion 102 and groove portion 103 according to a preferred embodiment of the present invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical disk to store data according to a land-groove recording method in which data is stored on both lands and grooves, comprising:

a disk substrate to transmit an incident laser beam having an associated wavelength $\lambda$ which is less than or equal to 680 nm therethrough;

a groove portion formed on said disk substrate and having an associated groove width, said groove portion having a groove depth d which is greater than 100 nm and which relates to the incident laser beam such that $d=\lambda/(4n)$ with n corresponding to the refractive index of said disk substrate; and a land portion formed on said disk substrate such that said land portion is farther away from the incident laser beam than said groove portion, and said land portion having a land width greater than the groove width, wherein a distance from a center of said groove portion to a center of said land portion horizontally across said disk substrate is defined as a track pitch, and said track pitch is less than or equal to 0.7 µm, such that the reflectivity of said land portion nearly equals the reflectivity of said groove portion.

2. A high recording density optical disk to store data according to a land-groove recording method in which data is stored on both lands and grooves, comprising:

a disk substrate to transmit an incident laser beam having an associated wavelength $\lambda$ which is less than or equal to 680 nm therethrough;

a groove portion formed on said disk substrate and having an associated groove width, said groove portion having a groove depth d which is greater than 100 nm to avoid cross erasure and which relates to the incident laser beam such that $d>\lambda/(4n)$ with n corresponding to the refractive index of said disk substrate, to avoid cross erasure; and a land portion formed on said disk substrate such that said land portion is farther away from the incident laser beam than said groove portion, and said land portion having a land width greater than the groove width, wherein a distance from a center of said groove portion to a center of said land portion horizontally across said disk substrate is defined as a track pitch, and said track pitch is less than or equal to 0.7 µm, such that a laser beam level of information reflected from said land portion nearly equals a laser beam level of information reflected from said groove portion.

3. The high recording density optical disk wherein according to claim 2, wherein $d \geq \lambda/(3n)$.

4. The high recording density optical disk wherein according to claim 2, wherein the ratio of said land portion to said groove portion is between 1.03 and 1.4.

5. The high recording density optical disk wherein according to claim 1, wherein $d \geq \lambda/(3n)$.

6. The high recording density optical disk wherein according to claim 1, wherein the ratio of said land portion to said groove portion is between 1.03 and 1.4.

7. An optical disk to store data on both lands and grooves, comprising in combination:

a disk substrate to transmit an laser beam light having a $\lambda \leq 680$ nm;

a groove portion having a groove depth $d>100$ nm and $d=\lambda/(4n)$ with n corresponding to the refractive index of said disk substrate; and a land portion having a land width greater than the groove width, wherein said groove portion and said land portion form a track pitch $\leq 0.7$ µm.

8. An optical disk to receive incident laser beam having a $\lambda \leq 680$ nm, comprising:

a groove portion having a groove depth $d>100$ nm and $d=\lambda/(4n)$ with n corresponding to the refractive index of said disk substrate; and a land portion having a land width greater than the groove width, said land portion forming with said groove portion to form a track pitch $\leq 0.7$ µm, such that the reflectivity of said land portion nearly equals the reflectivity of said groove portion.

* * * * *

UNITED STATES PATENT AND TRADEMARK OFFICE
CERTIFICATE OF CORRECTION

PATENT NO.: 5,991,258
DATED : November 23, 1999
INVENTOR(S): Seiji Morita, et al.

It is certified that error appears in the above-identified patent and that said Letters Patent is hereby corrected as shown below:

Title Page, References Cited
U.S. PATENT DOCUMENTS
change "5,852,591 12/1996" to --5,852,591 12/1998--, and change "6,406,546" to --5,406,546 --.

FOREIGN PATENT DOCUMENTS
change "596 716 11/1994" to --596 716 5/1994--.

Signed and Sealed this

Nineteenth Day of December, 2000

Attest:

Q. TODD DICKINSON

Attesting Officer

Commissioner of Patents and Trademarks